United States Patent Office 2,998,627
Patented Sept. 5, 1961

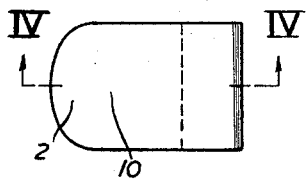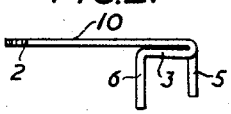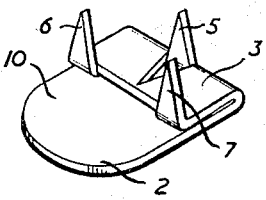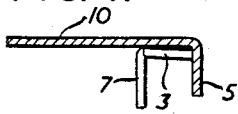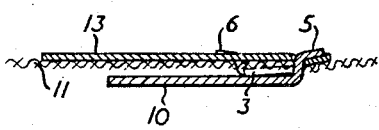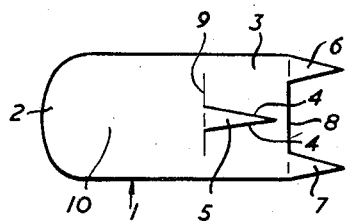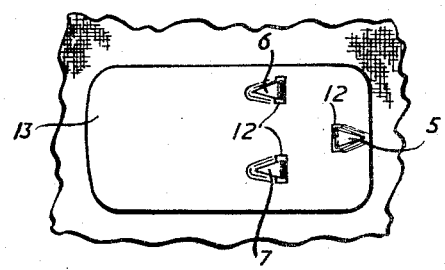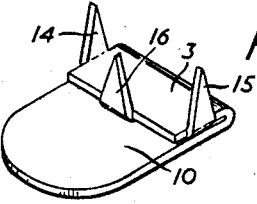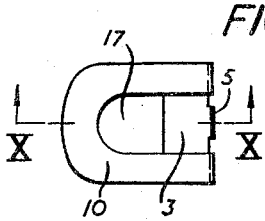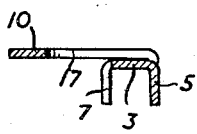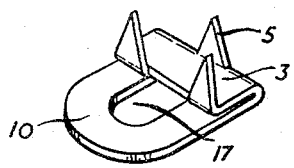

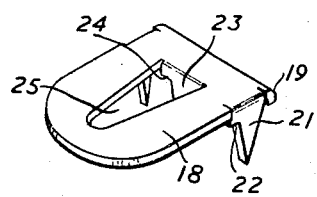
FIG.12.
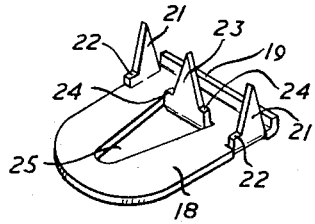
FIG.13.
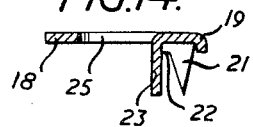
FIG.14.
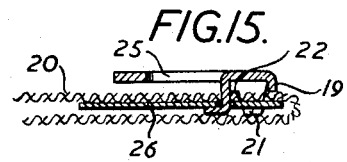
FIG.15.
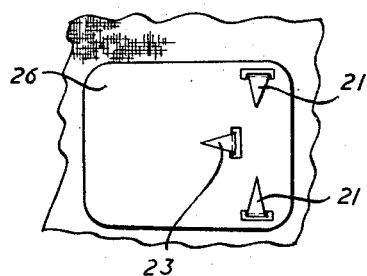
FIG.16.
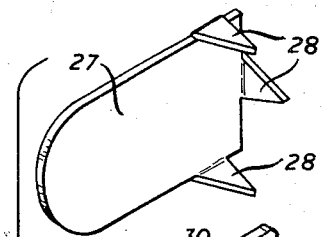
FIG.17.
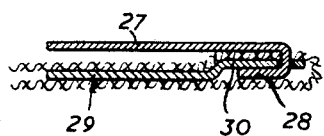
FIG.18.
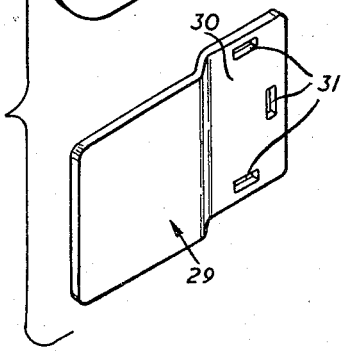
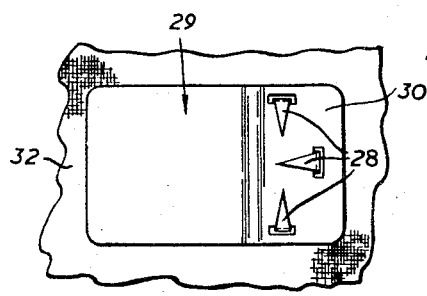
FIG.19.

2,998,627
FASTENING DEVICES FOR WEARING
APPAREL
Herbert Howard Wood, Birmingham, England, assignor to Thomas Walker Limited, Birmingham, England, a company of Great Britain
Filed Mar. 19, 1958, Ser. No. 722,482
Claims priority, application Great Britain Apr. 3, 1957
3 Claims. (Cl. 24—227)

This invention relates to fastening devices for connecting together overlapping edge or end portions of articles of wearing apparel, and especially for detachably connecting the ends of a trouser waistband, said devices being of the kind comprising a member for securing to one part of the garment and having a tongue or plate which is detachably engageable with a staple, bar or eye member on another part of the garment.

Heretofore the said member having the tongue or plate has usually been in the form of a hook consisting of a front tongue spaced from an integral base part by a distance sufficient to receive the staple or the like, said base part being adapted to be secured to the garment, such as by clenched prongs on the base part or by prongs on a back plate applied behind the material of the garment. When such hooks are secured to the outer face of the garment the thickness of the base part, and the spacing of the front tongue from the base part, results in the said front tongue projecting considerably from the face of the garment, and the device is very liable to be crushed and permanently distorted in pressing operations.

An object of the present invention is to provide an improved and simplified fastening device which can be made much shallower than can the usual hook type of fastener, so that when applied to the face of a garment the fastened ends or edges of the said garment can lie flatter and have a less bulky appearance, and which is not liable to be easily crushed.

According to the invention, a fastening device for wearing apparel comprises a flat front tongue adapted to be secured to the outer face of a garment, in combination with a back-plate adapted to be applied behind the material of the garment so as to lie behind the front tongue and to be secured to said tongue by means of clenchable prongs, either the front tongue or back-plate being provided with spacing means which, when the device is secured to a garment, is located beneath one end portion of the front tongue and in contact with the material of the garment and which elevates said tongue so as to form together with the associated back-plate the equivalent of a hook for engagement with a staple, bar or eye member, said spacing means also forming a stop intermediate the length of the front tongue for limiting inward movement of the staple or like co-operating member. The spacing means is contained substantially entirely beneath the front tongue and forms a surface for seating upon the garment material, the limits of which surface extend in the direction of the front tongue from one end thereof for a distance not greater than one third of the total length of the tongue.

Also, according to the invention a fastening device adapted to be secured to wearing apparel by means of clenchable prongs, comprises a flat plate forming a front tongue, one end portion of which plate is folded over on itself transversely so as to lie beneath one end of the front tongue substantially in contact therewith, thereby providing integral spacing means of less length than the front tongue adapted to lie in contact with the front face of the material of a garment when the device is attached thereto, and adapted to elevate the front tongue above the material so as to be engageable with a staple or like member, the free edge of the folded-over portion also providing stop means intermediate the length of the front tongue for limiting the inwards movement of such staple or like member.

Also, according to the invention, a fastening device adapted to be secured to wearing apparel by means of clenchable prongs, comprises a flat plate forming a front tongue one end portion of which is provided with rearwardly-extending projecting parts which, when the device is secured to a garment, are adapted to seat upon the outer face of the material and to elevate the front tongue above the material so as to be engageable with a staple or like member, at least some of said projecting parts forming stop means disposed intermediate the length of the front tongue for limiting the inwards movement of the staple or like member.

In one convenient form, the device consists of a plate or tongue one end portion of which is folded beneath the main portion to provide a double thickness which serves to elevate the opposite end portion above the face of the garment and also serves as a stop for the staple or the like. The folded part may carry prongs for attachment of the device. In another form the device consists of a plate or tongue provided at opposite sides of one end portion with bent-down spacing lugs or flanges carrying clenchable prongs, or with shouldered prongs, whereby, when the device is attached to a garment, the opposite end portion is elevated and spaced from the face of the garment. In a further form, a fastening device comprises a front plate or tongue and a back-plate adapted to be applied to opposite faces of the material of a garment and to be secured together by clenchable prongs on the one part engaging the other part, said back-plate having a raised portion on which the plate or tongue can be secured, with the garment material between, whereby an end portion of the front plate or tongue is elevated and spaced from the garment.

In the accompanying drawings,

FIGURE 1 is a plan view of one form of fastening device in accordance with the invention.

FIGURE 2 is a side elevation of the device of FIGURE 1.

FIGURE 3 is an underside perspective view of the fastening device shown in FIGURE 1.

FIGURE 4 is a longitudinal section on line IV—IV, FIGURE 1.

FIGURE 5 is a longitudinal section of the device shown in FIGURE 1 showing the device attached to one thickness of material of a garment.

FIGURE 6 is an underside plan view showing the associated back-plate when the device shown in FIGURE 1 is attached to material.

FIGURE 7 is a plan view of a sheet-metal blank from which the above fastening device shown in FIGURE 1 is formed.

FIGURE 8 is an underside plan view of a modified form of fastening device.

FIGURE 9 is a plan view of a further modification.

FIGURE 10 is a longitudinal section on line X—X, FIGURE 9.

FIGURE 11 is an underside perspective view of the form of FIGURE 9.

FIGURES 12 and 13 are top and underside perspective views respectively of another modification.

FIGURE 14 is a longitudinal section of this latter modification, and

FIGURE 15 is a similar longitudinal section showing the device shown in FIGURE 12 attached to material.

FIGURE 16 is an underside plan view of this latter fastening device attached to material, showing the associated back-plate in position.

FIGURE 17 shows perspective views of a yet further form of fastening device and its associated back-plate.

FIGURES 18 and 19 represent respectively a longitudinal section and an underside plan view of this last modified fastening device attached to material.

Referring to the drawings, in each of the forms illustrated in FIGURES 1 to 11, the device comprises a plate or tongue one end portion of which carries integral attachment prongs and is folded to provide a double thickness for elevating the opposite end portion above the surface of the garment. More specifically, the device of FIGURES 1 to 7 is formed from a blank (FIGURE 7) consisting of a flat sheet-metal plate 1 of parallel-sided form with one end 2, called the front end, of rounded shape. The other or rear end portion 3 is slit longitudinally at two points 4, 4, for a short distance to form a central pointed prong 5, whilst similar pointed prongs 6, 7, project integrally at opposite sides of the rear edge 8 of the plate 1. This prong-carrying rear end portion 3 of the plate 1 is doubled back and folded along a transverse line 9 passing through the root end of the central prong 5, so as to lie beneath and close to the lower face of the main portion of the plate 1, which main portion forms a front tongue 10. This folded-under rear portion 3 extends for about one-third the length of the main front tongue portion 10 of the plate, and the three prongs 5, 6, 7, thereon are bent down at right-angles, thus providing one prong (5) at the middle of the rear end of the device and two prongs (6 and 7) situated at the forward edge of the bent-under part 3, one at each side.

The fastening device made as described above is intended to be attached, as shown in FIGURES 5 and 6, to the outer face of one end of the trouser waistband 11, the prongs 5, 6 and 7 being forced through the material of the band 11 and through slots 12 in a sheet-metal back-plate 13 applied to the inside face of the material, this back-plate 13 being located within the usual pocket or hollow interior of the waistband. As the prongs 5, 6 and 7 are passed through the slots 12, they are clenched on to the face of the back-plate 13.

The back-plate 13 may be of any desired size, but preferably it is of rectangular shape as shown, and it extends beneath the front tongue 10 so as to form therewith the equivalent of a hook and at the same time form a support for the cloth.

The front tongue 10 is spaced from the face of the waistband 11 by a distance just sufficient to allow the staple or eye member on the other end of the waistband to pass under it, and the forward end of the bent-under rear portion 3 of the device forms a stop for said staple or eye member, which cannot, therefore, pass between the said bent-under portion 3 and the front tongue 10 of the device.

Instead of the prongs being provided two along the transverse forward free edge of the folded portion 3, and one in the middle of the rear end of the device, as shown in FIGURE 8, two prongs 14, 15, may be situated respectively along the top and bottom edges of the folded portion 3 and one prong 16 along the forward free edge of the latter part.

In a further modification illustrated in FIGURES 9 to 11, the prongs are disposed in the same relative positions as in the first-described form, but the one prong 5 which is at the rear end of the device is formed from out of a longitudinal slot 17 in the front tongue 10 instead of being struck out of the metal of folded-over portion 3.

According to the modified construction shown in FIGURES 12 to 16, the fastening device may consist of a flat front plate or tongue 18 having a rear edge turned down to form a shallow flange 19 which seats upon the outside face of the waistband 20 (see FIGURE 15), and at opposite sides of the tongue 18, adjacent said rear flange 19, are depending pointed prongs 21, 21, each having, near its upper or root end, a lateral shoulder 22 situated below the tongue 18 by a distance equal to the depth of the rear flange 19, so as to be level with the lower edge of said flange. A third depending prong 23, which has a pair of similar shoulders 24, 24, is provided in the longitudinal median line of the front plate or tongue 18, and in the formation of this fastening device the prong 23 is formed from out of a slotted portion 25 in the plate or tongue 18.

The device is secured to the front face of the waistband 20 by passing the prongs 21 and 23 through the material and clenching them over on to an apertured back-plate 26 which extends beneath the front tongue 18, as in the previously-described embodiments. When the device is thus secured, the rear flange 19 and the shoulders 22 and 24 of the prongs 21 and 23 seat on the surface of the band 20 and cause the front tongue 18 to be spaced from said band by a distance suitable for receiving the staple or eye member, and the shouldered root ends 22 and 24 of some or all of the prongs, which ends are aligned transversely, form stops for limiting the inward movement of the staple or eye member.

In the further modification illustrated in FIGURES 17 to 19, the front plate or tongue consists of a plain flat plate 27 carrying three integral prongs 28 and the back-plate 29 is cranked to provide a raised part 30 provided with the prong-receiving apertures 31. In use, the prong-carrying end of the front tongue 27 is seated on the raised part 30 of the back-plate 29 with the waistband material 32 between (see FIGURE 18) and the said raised part 30 serves to elevate the forward portion of the front plate 27 sufficiently for a staple or eye member to pass under.

Instead of the prongs being on the front plate or tongue, they may be on the back plate, being passed through suitable openings in the front plate or tongue and clenched.

I claim:

1. A sheet-metal fastening device cooperable with an eye member for connecting together overlapping parts of garment apparel, said device consisting of the combination of a flat plate constituting an elongated front tongue for applying to the outer face of the garment material and engaging the cooperable eye member, with a back-plate for applying to the inner face of garment material at the back of said front tongue, clenchable attachment prongs for securing together the front tongue and back-plate with the garment material interposed therebetween, and spacing means for elevating in the manner of a cantilever at least a portion of said front tongue above the garment material lying against the back-plate by a height suitable for receiving the eye member, said back plate extending at least partly under said cantilever-like portion of the front tongue when the device is attached to the garment material, said spacing means forming a seating surface for contacting directly the garment material and also providing an abutment stop having a height substantially equal to said height of elevation of the front tongue, said stop being beneath the front tongue at a location intermediate its length, whereby inward movement of the cooperating eye member for the entire length of the front tongue is prevented, at least two-thirds of the length of said front tongue projecting forwards beyond said abutment stop and said spacing means to form a box-like space extending between the under surface of said front tongue and the garment material to which the device is attached, said space being entirely open and unobstructed along three sides for receiving the eye member, said spacing means and said attachment prongs being confined to an area substantially completely underlying the end portion of the front tongue which includes and lies behind said abutment stop, whereby the boundary edges of said front tongue represent substantially the confines of the entire fastening device.

2. A sheet-metal fastening element cooperable with an eye member for connecting together overlapping parts of garment apparel, said element consisting of a flat plate constituting an elongated front tongue for applying to the outer face of the garment material and for engaging the cooperating eye member, a plurality of clenchable attachment prongs for securing the front tongue to the garment material, and a plurality of rearwardly-extending projections integrally carried by said front tongue which seat upon the outer face of garment material to which the fastening element is attached and serving to elevate in the manner of a cantilever said front tongue by a height suitable for receiving the eye member, at least some of said projections also forming an abutment stop having a height substantially equal to said height of elevation of the front tongue and disposed beneath the front tongue at a location intermediate its length, whereby inward movement of the cooperating eye member for the entire length of the front tongue is prevented, at least two-thirds of the length of said front tongue projecting forward beyond said abutment stop to form a box-like space extending between the under surface of said front tongue and the garment material to which the element is attached, said space being entirely open and unobstructed along three sides for receiving the eye member, said projections and said attachment prongs all being confined to an area substantially completely underlying the end portion of the front tongue which includes and lies behind said abutment stop, whereby the boundary edge of the front tongue represents substantially the confines of the entire fastening element.

3. A sheet-metal fastening element cooperable with an eye member for connecting together overlapping parts of garment apparel, said element consisting of a flat plate constituting an elongated front tongue for applying to the outer face of the garment material and for engaging the cooperating eye member, an integral rearwardly-directed transverse spacing flange at an end of the front tongue, and a plurality of integral rearwardly-directed shouldered prongs for securing the fastening element to the garment material, the shoulders of said prongs and the said spacing flange being adapted to seat upon the outer face of the garment material and serving to elevate in the manner of a cantilever said front tongue by a height suitable for receiving the eye member, the shoulders of at least some of said prongs also forming an abutment stop having a height substantially equal to said height of elevation of the front tongue and disposed beneath the front tongue at a location intermediate its length, whereby inward movement of the cooperating eye member for the entire length of the front tongue is prevented, at least two-thirds of the length of said front tongue projecting forward beyond said abutment stop to form a box-like space extending between the under surface of said front tongue and the garment material to which the element is attached, said space being entirely open and unobstructed along three sides for receiving the eye member, said spacing flange and said shouldered prongs all being confined to an area substantially completely underlying the end portion of the front tongue which includes and lies behind said abutment stop, whereby the boundary edge of the front tongue represents substantially the confines of the entire fastening element.

References Cited in the file of this patent

UNITED STATES PATENTS

| 534,725 | Stall | Feb. 26, 1895 |
| 954,458 | Patterson | Apr. 12, 1910 |
| 2,703,915 | Markin | Mar. 15, 1955 |
| 2,731,694 | Steinmetz | Jan. 24, 1956 |
| 2,778,082 | Stoughton | Jan. 22, 1957 |

FOREIGN PATENTS

| 161,501 | Australia | Feb. 25, 1955 |